United States Patent
Ling

(10) Patent No.: US 6,557,808 B1
(45) Date of Patent: May 6, 2003

(54) TWO-PIECE DETACHABLE HOLDER

(76) Inventor: Renny Tse-Haw Ling, 3F, No. 2, Lane 93, Chien-I Road, Chung-Ho City, Taipei Hsien (TW)

( * ) Notice: Subject to any disclaimer, the term of this patent is extended or adjusted under 35 U.S.C. 154(b) by 0 days.

(21) Appl. No.: 10/073,222

(22) Filed: Feb. 13, 2002

(51) Int. Cl.[7] .............................................. A47B 96/06
(52) U.S. Cl. .................... 248/229.1; 224/425; 224/935; 248/227.3; 403/325; 403/331
(58) Field of Search ................................ 224/425, 443, 224/935; 248/223.41, 229.1, 229.13, 229.23, 226.11, 227.3, 230.4, 316.5, 218.4, 314; 403/331, 341, 329, 321, 325, 322.4

(56) References Cited

U.S. PATENT DOCUMENTS

| | | | | |
|---|---|---|---|---|
| 4,966,382 A | * | 10/1990 | Giles | 224/275 |
| 5,076,526 A | * | 12/1991 | Zane et al. | 224/425 |
| 5,386,961 A | * | 2/1995 | Lu | 224/425 |
| 5,405,113 A | * | 4/1995 | Jaw | 224/425 |
| 5,647,520 A | * | 7/1997 | McDaid | 224/425 |
| 5,653,365 A | * | 8/1997 | Lee | 224/445 |
| 5,669,536 A | * | 9/1997 | Wang | 224/443 |

* cited by examiner

Primary Examiner—Ramon O. Ramirez
(74) Attorney, Agent, or Firm—Troxell Law Office PLLC

(57) ABSTRACT

A two-piece detachable holder includes a position seat and a fastener. The position seat is fastened on a support while the fastener is used for holding the object to be fastened. An inserting device is set between the position seat and the fastener to enable the fastener to be quickly inserted on the position seat in vertical, transverse, and oblique directions and to be fastened by the position seat.

4 Claims, 4 Drawing Sheets

TWO-PIECE DETACHABLE HOLDER

FIELD OF THE INVENTION

The present invention relates to holder, especially to a two-piece detachable holder which can allow an object to be inserted in various directions and which can be fastened to a support quickly and accurately.

DESCRIPTION OF THE PRIOR ART

There are many kinds of conventionally used holders, such as a lock holder for a bicycle. The lock holder is commonly set on the frame under the seat and is used for holding a lock.

One of the above-mentioned lock holders is described in U.S. Pat. No. 4,966,383, which provides a fastening structure for a coiled shackle. This invention has a complicated shape and, thus, the manufacturing cost is high. In addition, the invention is inconvenient to use. Another similar product is provided in U.S. Pat. No. 5,076,526 with a simpler structure. However, the user has to insert the lock into the lock holder in one certain direction and then fasten the lock by hand or using tools. Therefore, this way really consumes time and effort. In U.S. Pat. No. 5,647,520, a tooth-type part is used to clip the lock for increasing stability. However, it is too complicated because of adding the tooth-type structure. Besides, there is still directional limitations. A rotational lock holder is provided in U.S. Pat. No. 5,669,536 with a complicated structure that is not easy to use.

Accordingly, conventional products still have many disadvantages and are not perfect designs such that improvement is required.

SUMMARY OF THE INVENTION

The first purpose of the present invention is to provide a two-piece detachable holder, which has quick and accurate clipping motion, and steadily holds an object without additional adjustment.

The second purpose of the present invention is to provide such a holder which automatically locks the object to prevent the object from loosening.

The third purpose of the present invention is to provide such a holder which allows the object to be inserted in various directions such that the user can operate the holder more smoothly.

The other purpose of the present invention is to provide a holder which can be applied to many aspects. In addition to the lock holder of the bicycle described above, the present invention can be used to hang a kettle and other devices, or be applied in home life to provide the function of neat placement.

BRIEF DESCRIPTION OF THE DRAWINGS

The drawings disclose an illustrative embodiment of the present invention which serves to exemplify the various advantages and objects hereof, and are as follows:

FIG. 2A is the end view of the position seat of the present invention;

DIAGRAM REMARKS

Figure 1:
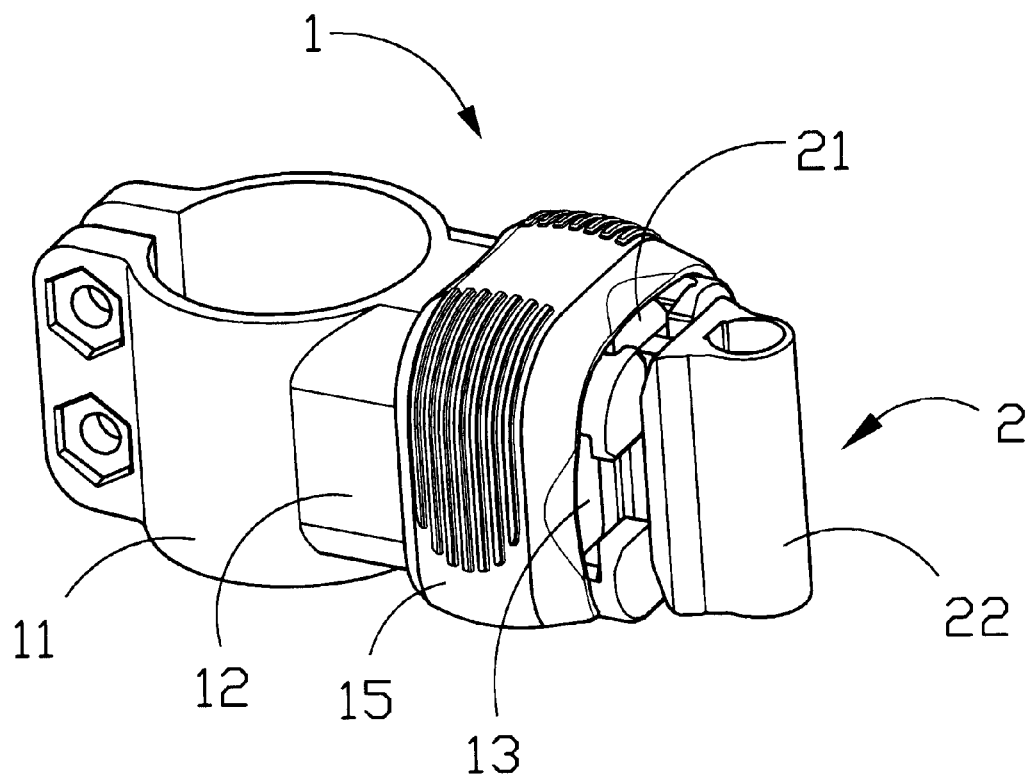
FIG. 1 is the three-dimensional drawing of the present invention.

1 Position seat
11 Clamp
12 Pillar
13 Guide groove
14 Elastic part
15 Sliding cover
16 Elastic part
2 Fastener
21 Track
22 Connecting part
3 Frame
4 Lock

DETAILED DESCRIPTION OF THE PREFERRED EMBODIMENT

Figure 2:
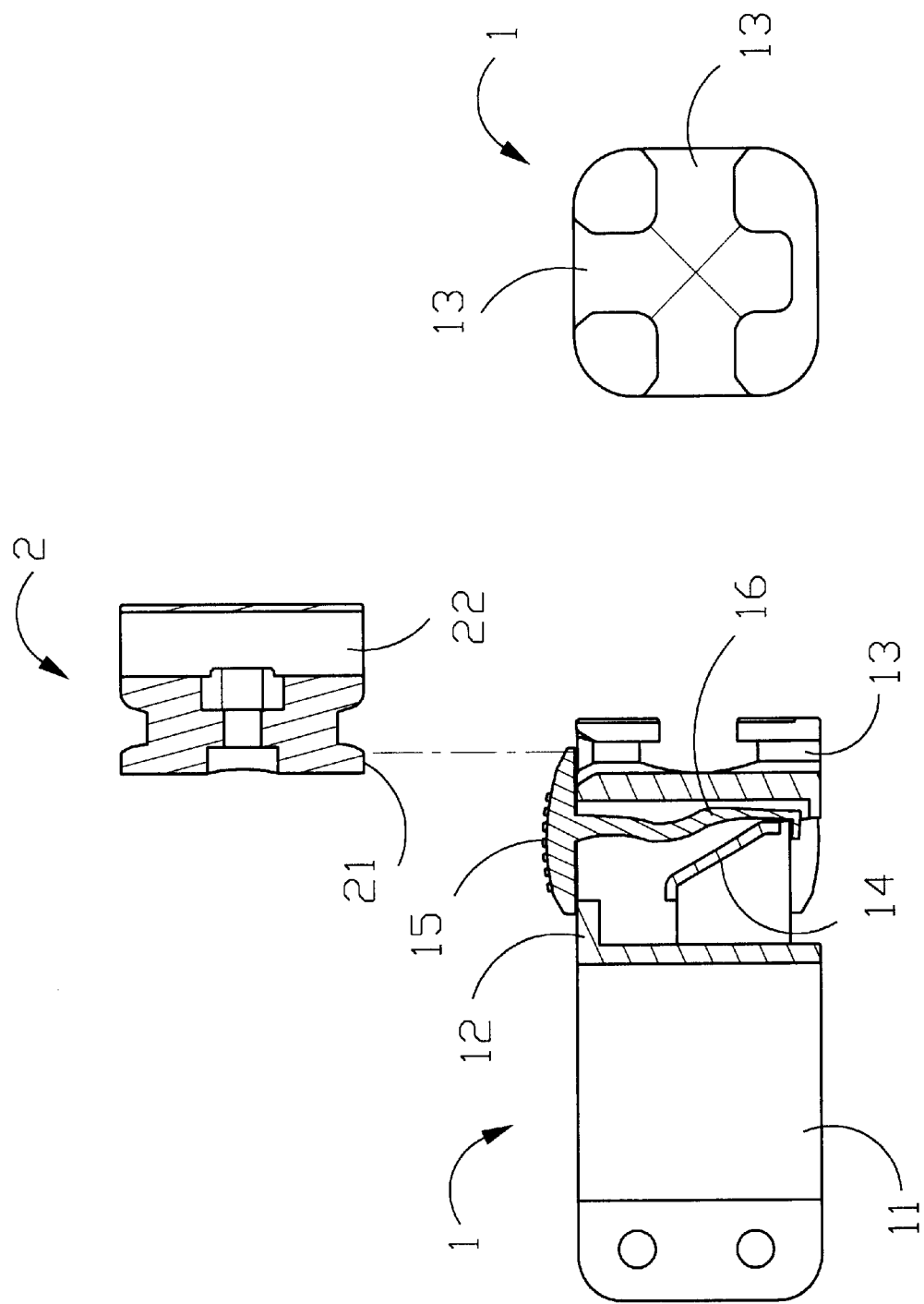
FIG. 2 is the cross-section view of the structure of the present invention.

Referring to FIG. 1, FIG. 2, FIG. 2A, a holder of the present invention mainly comprises a position seat 1 and a fastener 2. A clamp 11 is set at one end of the position seat 1 to enable the position seat 1 to be attached to a support. A pillar 12 is extended from the fastener 11, and has guide grooves 13 at the front end. The guide grooves 13 can be oriented in vertical, transverse and oblique directions. The number of the guide grooves 13 can be one, or more than one, so that the positioning of the fastener 2 can be performed conveniently. An elastic part 14 is set inside the pillar 12, and a sliding cover 15 is slipped on the pillar 12. The sliding cover 15 extends into the pillar 12 by an elastic part 16. In this way, the elastic part 14 inside the pillar 12 and the elastic part 16 of the sliding cover 15 can push each other. When the sliding cover 15 is acted on by a force, it can slide on the pillar; on the contrary, the sliding cover 15 can go back to the front end of the pillar 12 with a push of the elastic part 14 and the elastic part 16 when the force disappears. The elastic part 14 inside the pillar 12 and the elastic part 16 of the sliding cover 15 can be springs or other parts having elasticity to reach the same function. This method is just a simple replacement and thus the detail won't be described here. A track 21 is set at one side of the fastener 2 to be inserted into the position seat 1 along the guide groove 13. A connecting part 22 is set next to the track 21 to enable the fastener 2 to be connected to the object.

Figure 3:
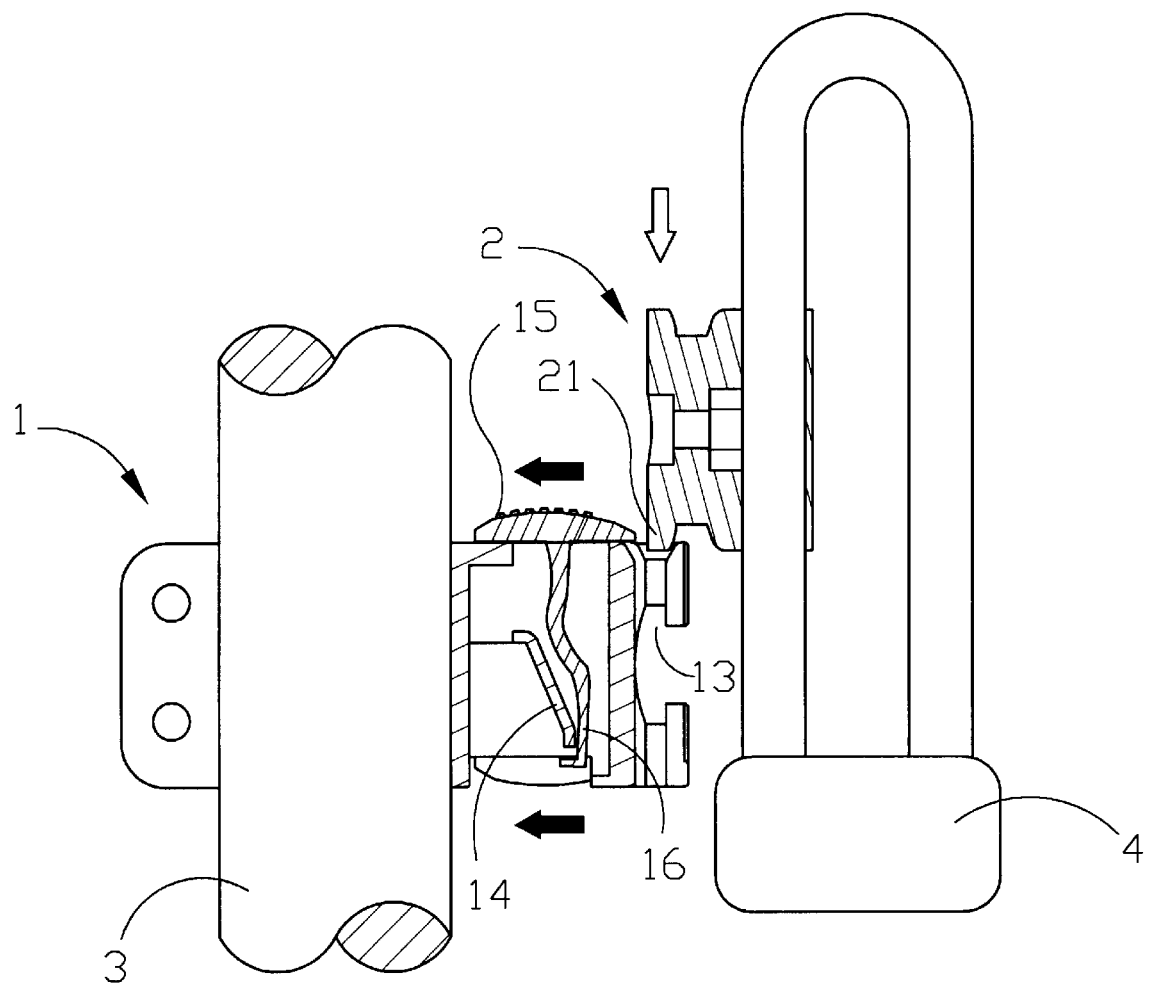
FIG. 3 is the acting diagram of the present invention.
Figure 4:
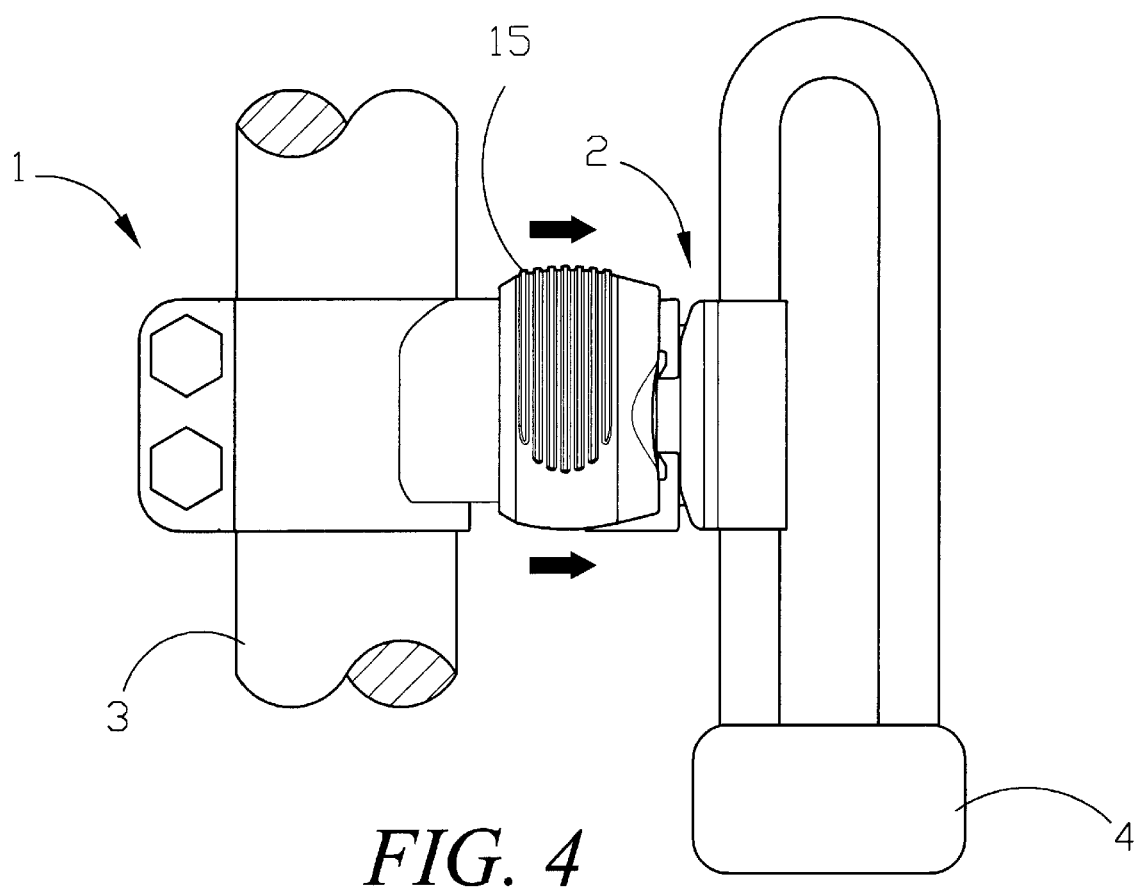
FIG. 4 is the diagram of the present invention after the clipping motion is completed.

Referring to FIG. 3 and FIG. 4, the present invention can be applied to fasten a lock of a bicycle. In the figures, the position seat 1 is attached to the frame 3 of the bicycle by the clamp 11 first, and then the fastener 2 is connected to the lock 4 by the connecting part 22. In addition, the connecting part 22 of the fastener 2 can also be combined with the lock 4 so that both of them can be manufactured together. When using the present invention, the user just inserts the track 21 of the fastener 2 into the guide groove 13 to push the sliding cover 15 rearwardly. After the track 21 entirely enters into the guide groove 13, the sliding cover 15 is pushed by the elastic part 14 and elastic part 16 to return to the original position, and thus covers the outside of the guide groove 13 and the track 21 to prevent the fastener 2 from departing from the position seat 1. On the contrary, when the user pushes the sliding cover 15 rearwardly, the track 21 can be moved outwardly from the guide groove 13 to make the fastener 2 depart from the position seat 1, and then the lock 4 can be used.

The fastener 2 of the holder of the present invention can position the object in various directions so that the user can use it conveniently. Besides the motion is accurate under operation, and the locking and fastening task can be performed automatically without additional manual operation.

In particular, the holder can be applied to various aspects, and is conducive to popularize related products.

Many changes and modifications in the above described embodiment of the invention can, of course, be carried out without departing form the scope thereof. Accordingly, to promote the progress in science and the useful arts, the invention is disclosed and is intended to be limited only by the scope of the appended claims.

What is claimed is:

1. A two-piece detachable holder, which comprises:
    a position seat including a clamp at an end, said clamp enabling said position seat to be attached to a support; a pillar extending from said clamp, a front end of the pillar having a plurality of guide grooves; a sliding cover movably located on an outside of said pillar; a first elastic part and a second elastic part being set between said sliding cover and said pillar to bias said sliding cover toward an initial position on said pillar after being displaced from the initial position; and
    a fastener having a track at one side such that said track is removably inserted into one of said plurality of guide grooves of said pillar, the track having a connecting part holding an object.

2. The holder as recited in claim 1, wherein said first elastic part and said second elastic part are springs.

3. The holder as recited in claim 1, wherein said plurality of guide grooves of said pillar are oriented in vertical, transverse, and oblique directions.

4. The holder as recited in claim 1, wherein said connecting part of the fastener is made integral with said object to be fastened.

* * * * *